United States Patent
Einoegg et al.

(10) Patent No.: US 11,165,108 B2
(45) Date of Patent: Nov. 2, 2021

(54) HIGH VOLTAGE ACCUMULATOR

(71) Applicant: Bayerische Motoren Werke Aktiengesellschaft, Munich (DE)

(72) Inventors: Florian Einoegg, Biessenhofen (DE); Michael Huber, Munich (DE); Jan Feddersen, Munich (DE); Andreas Ring, Olching (DE); Marc Ulbrich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 128 days.

(21) Appl. No.: 16/578,453

(22) Filed: Sep. 23, 2019

(65) Prior Publication Data

US 2020/0020994 A1 Jan. 16, 2020

Related U.S. Application Data

(63) Continuation of application No. PCT/EP2018/057099, filed on Mar. 21, 2018.

(30) Foreign Application Priority Data

Apr. 4, 2017 (DE) .................... 10 2017 205 701.7

(51) Int. Cl.
*H01M 10/613* (2014.01)
*H01M 10/617* (2014.01)
(Continued)

(52) U.S. Cl.
CPC ....... *H01M 10/613* (2015.04); *H01M 10/617* (2015.04); *H01M 10/625* (2015.04); *H01M 10/6568* (2015.04)

(58) Field of Classification Search
CPC ............. H01M 10/613; H01M 10/617; H01M 10/625; H01M 10/6568; H01M 10/6556; Y02E 60/10
See application file for complete search history.

(56) References Cited

U.S. PATENT DOCUMENTS

| | | | |
|---|---|---|---|
| 2013/0189557 A1 | 7/2013 | Haussmann | |
| 2015/0140388 A1* | 5/2015 | Harada | H01M 10/617 429/120 |
| 2016/0233565 A1* | 8/2016 | Weileder | H01M 10/625 |

FOREIGN PATENT DOCUMENTS

| | | |
|---|---|---|
| DE | 10 2009 015 351 A1 | 9/2010 |
| DE | 10 2010 032 899 A1 | 2/2012 |

(Continued)

OTHER PUBLICATIONS

International Search Report (PCT/ISA/210) issued in PCT Application No. PCT/EP2018/057099 dated Jun. 7, 2018 with English translation (five pages).

(Continued)

*Primary Examiner* — Muhammad S Siddiquee
(74) *Attorney, Agent, or Firm* — Crowell & Moring LLP

(57) ABSTRACT

A high voltage accumulator has a first and second accumulator module, each having at least two electrical accumulator cells and a cooling module through which a coolant or refrigerant flows. The cooling modules of the two accumulator modules are designed identically, completely or at least in the region of the fluid connection points. A supply channel is fluidically connected to a first fluid connection point of the cooling module of the first accumulator module and to a second fluid connection point of the cooling module of the second accumulator module, and a discharge channel is fluidically connected to a second fluid connection point of the cooling module of the first accumulator module and to a first fluid connection point of the cooling module of the second accumulator module, such that coolant or refrigerant flows through the first cooling module in the opposite direction as the second cooling module.

12 Claims, 2 Drawing Sheets

(51) Int. Cl.
*H01M 10/625* (2014.01)
*H01M 10/6568* (2014.01)

(56) References Cited

FOREIGN PATENT DOCUMENTS

| | | |
|---|---|---|
| DE | 10 2012 009 492 A1 | 11/2013 |
| DE | 10 2013 225 521 A1 | 6/2015 |
| EP | 2 851 991 A1 | 3/2015 |

OTHER PUBLICATIONS

German-language Written Opinion (PCT/ISA/237) issued in PCT Application No. PCT/EP2018/057099 dated Jun. 7, 2018 (seven pages).
German-language Office Action issued in counterpart German Application No. 10 2017 205 701.7 dated Nov. 10, 2017 (four pages).

\* cited by examiner

HIGH VOLTAGE ACCUMULATOR

CROSS REFERENCE TO RELATED APPLICATIONS

This application is a continuation of PCT International Application No. PCT/EP2018/057099, filed Mar. 21, 2018, which claims priority under 35 U.S.C. § 119 from German Patent Application No. 10 2017 205 701.7, filed Apr. 4, 2017, the entire disclosures of which are herein expressly incorporated by reference.

BACKGROUND AND SUMMARY OF THE INVENTION

The present invention relates to a high-voltage accumulator, in particular for vehicles.

Vehicles having an electric or hybrid drive require a high-voltage accumulator with a high storage capacity and a high power density. During rapid charging or discharging of the high-voltage accumulator, considerable amounts of heat are generated, which have to be reliably removed in order to avoid damage to the accumulator cells of the high-voltage accumulator. A high-performance cooling device, which has to be integrated into the high-voltage accumulator and thermally coupled to the accumulator cells, is required for this purpose.

When vehicles are constructed, the available installation space must be used as efficiently as possible. This also applies in particular to the design of the high-voltage accumulator, that is to say to the arrangement and design of the individual accumulator modules of the high-voltage accumulator, which in turn consist of multiple accumulator cells, and with regard to the cooling device for cooling the accumulator cells or accumulator modules.

Use is normally made of liquid-cooled cooling devices. Here, each accumulator module is normally assigned a cooling plate, on which the individual accumulator cells of the accumulator module are arranged.

Heat produced during charging or discharging is transferred from the accumulator cells to the cooling plate and is removed by way of coolant or refrigerant flowing through flow channels which are provided in the cooling plate. Each cooling plate has at least one fluid connector for cold coolant or refrigerant and at least one further fluid connector for heated coolant or refrigerant.

It is an object of the invention to provide a high-voltage accumulator which, in particular with regard to the connection in terms of flow of the cooling modules of the individual accumulator modules, makes a compact design possible.

This and other objects are achieved by the high voltage accumulator according to the claimed invention.

The starting point of the invention is a high-voltage accumulator having at least one pair of accumulator modules, specifically a first accumulator module and a second accumulator module. Such accumulator modules each consist of multiple accumulator cells, which are arranged one behind the other in a row.

The accumulator cells may be accommodated for example in a light-metal housing (for example aluminum housing) and may have a substantially cuboidal or prismatic shape. Alternatively, the accumulator cells may be so-called pouch cells, in the case of which the housing is formed by a flexurally elastic sack composed of a metal or plastic film.

The individual accumulator cells of an accumulator module are normally clamped together. For this purpose, a first pressure plate is arranged in front of a first accumulator cell of the accumulator module and a second pressure plate is arranged behind a last accumulator cell of the accumulator module. The pressure plates are then normally clamped together via so-called tensioning bands running laterally along the accumulator module.

Such an accumulator module therefore has at least two electrical accumulator cells (preferably more than two electrical accumulator cells). Each accumulator module also has one cooling module, through which a coolant or refrigerant flows. Such a cooling module may have for example a plate-like shape, with flow channels for coolant or refrigerant being provided in the cooling module or in the "cooling plate". The accumulator cells or the accumulator cell pack of an accumulator module may be arranged on the cooling module or on the cooling plate. In this case, the individual accumulator cells have a thermally highly conductive connection to the cooling module or the cooling plate, whereby efficient removal of heat from the accumulator cells to the cooling module is made possible.

The cooling modules also each have a first and a second fluid connector for coolant or refrigerant. Cold coolant or refrigerant flows into the cooling module via one of the two fluid connectors. Heated coolant or refrigerant flows out of the cooling module via the other fluid connector.

The high-voltage accumulator according to the invention has at least one pair of accumulator modules, that is to say at least two accumulator modules. Preferably, however, the high-voltage accumulator has multiple pairs of accumulator modules, wherein the individual pairs of accumulator modules can be arranged for example one behind the other in a row.

The high-voltage accumulator according to the invention also has a (central) inflow channel for cold coolant or refrigerant, which is fluidically connected to in each case one fluid connector of each of the two cooling modules of the at least one pair of accumulator modules, and a (central) outflow channel for heated coolant or refrigerant, which is fluidically connected to the respective other fluid connector of the two cooling modules of the pair of accumulator modules.

An aspect of the invention is that the cooling modules of the at least one pair of accumulator modules are, in their entirety or at least in the region of the fluid connectors, of identical design. Preferably, the cooling modules of the individual accumulator modules are of completely identical design, this making possible an identical-parts concept and thus cost savings.

A further, very essential concept of the invention is that the (central) inflow channel is fluidically connected to the first fluid connector of the cooling module of the first accumulator module and to the second fluid connector of the cooling module of the second accumulator module. In a completely analogous way, the (central) outflow channel is connected to the second fluid connector of the cooling module of the first accumulator module and to the first fluid connector of the cooling module of the second accumulator module.

By way of this "counterdirectional connection concept", it is achieved that the coolant or refrigerant flows through the first cooling module in an opposite direction to the one in which the coolant or refrigerant flows through the second cooling module. This in turn allows a particularly compact, that is to say installation space-saving, fluidic connection of the cooling modules of the at least one pair of accumulator modules to the (central) inflow channel and the (central) outflow channel, wherein the cooling modules of the accumulator modules may, at least in the region of the fluid connectors but preferably in their entirety, be of identical design, which, from cost aspects, is very advantageous.

The invention consequently allows a "point-symmetrical arrangement" of the cooling modules of the at least one pair of accumulator modules. That is to say that the cooling module of the first accumulator module is preferably arranged in a point-symmetrical manner with respect to the cooling module of the second accumulator module, and vice versa.

Correspondingly, it may be provided that the first fluid connector of the cooling module of the first accumulator module is arranged in a point-symmetrical manner with respect to the first fluid connector of the second accumulator module, and vice versa. Furthermore, in a completely analogous way, it may be provided that the second fluid connector of the cooling module of the first accumulator module is arranged in a point-symmetrical manner with respect to the second fluid connector of the second accumulator module, and vice versa.

According to one refinement of the invention, the cooling modules each have a connection region in which the first and second fluid connectors are provided. As viewed in a longitudinal direction of the (central) inflow channel and/or the (central) outflow channel, the connection region of the cooling module of the first accumulator module is preferably arranged in front of the connection region of the cooling module of the second accumulator module, or vice versa. This means that, as viewed in the longitudinal direction of the inflow channel and/or the outflow channel, the connection regions of the two cooling modules of the at least one pair of accumulator modules overlap one another.

It is particularly advantageous if, as viewed in a first direction, in particular in a longitudinal direction of the inflow channel and/or the outflow channel, the first fluid connector of the cooling module of the first accumulator module is arranged in front of the second fluid connector of the cooling module of the second accumulator module, or vice versa. In a completely analogous way, it is advantageous if, as viewed in the first direction, in particular in the longitudinal direction of the inflow channel and/or the outflow channel, the second fluid connector of the cooling module of the first accumulator module is arranged in front of the first fluid connector of the cooling module of the second accumulator module, or vice versa.

In this way, it is possible for the cooling modules to be connected to the inflow channel and the outflow channel in a highly space-saving manner, wherein, by way of the above-described arrangement, the counterdirectional throughflow typical of the invention of the cooling modules of the at least one pair of accumulator modules is achieved, that is to say that coolant or refrigerant flows through the first cooling module in the opposite direction to the one in which coolant or refrigerant flows through the second cooling module of the at least one pair of accumulator modules.

According to one refinement of the invention, the inflow channel and the outflow channel are arranged in a parallel manner at least in the region between the first and second accumulator modules.

As already mentioned, the high-voltage accumulator may have multiple pairs of first and second accumulator modules, which pairs are arranged one behind the other in the first direction. In this case, it may be provided that the inflow channel and the outflow channel extend in the first direction in the region between the first and second accumulator modules of the pairs of accumulator modules. It is possible at least in the region between the first and second accumulator modules of the multiple pairs of accumulator modules for the inflow channel and the outflow channel to be designed as straight tubes, which may be arranged in a parallel manner.

The high-voltage accumulator according to the invention may be installed in particular into a hybrid vehicle or into a purely electric vehicle, that is to say into a vehicle which has at least one electric drive motor that generates vehicle propulsion.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
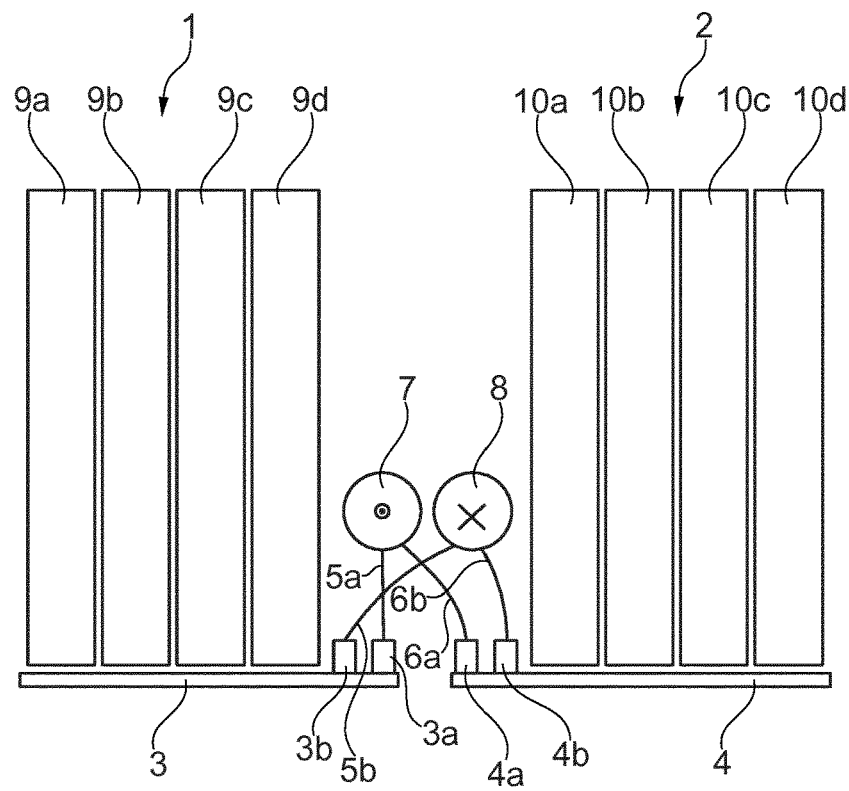
FIGS. 1A, 1B show a conventional connection of the cooling modules of a pair of accumulator modules to a central inflow channel and a central outflow channel for coolants or refrigerants (prior art).

FIG. 1A shows, in a side view, a pair of accumulator modules 1, 2. Each of the accumulator modules has a cooling plate 3, 4. The cooling plate 3 has a first fluid connector 3a and a second fluid connector 3b. Correspondingly, the cooling plate 4 has a first fluid connector 4a and a second fluid connector 4b.

The first fluid connectors 3a, 4a are connected via fluid connections 5a, 6a to a central inflow channel 7, via which cold coolant or refrigerant can be supplied to the cooling plates 3, 4. The second fluid connectors 3b, 4b are connected via fluid connections 5b, 6b to a central outflow channel 8, via which heated coolant or refrigerant can be removed from the cooling modules 3, 4.

Accumulator cells 9a-9d and 10a-10d are respectively arranged on the cooling modules or cooling plates 3, 4. Heat emitted during charging or discharging of the accumulator cells 9a-9d and 10a-10d is removed via the cooling modules 3, 4, through which the coolant or refrigerant flows.

As can be seen from FIG. 1A, with this arrangement of the cooling modules 3, 4 or fluid connectors 3a, 3b and 4a, 4b, a cumbersome "crossing" arrangement of the fluid connections 5b and 6a is necessary, which cannot be regarded as an ideal solution both from assembly aspects and from installation space aspects.

Figure 1B:
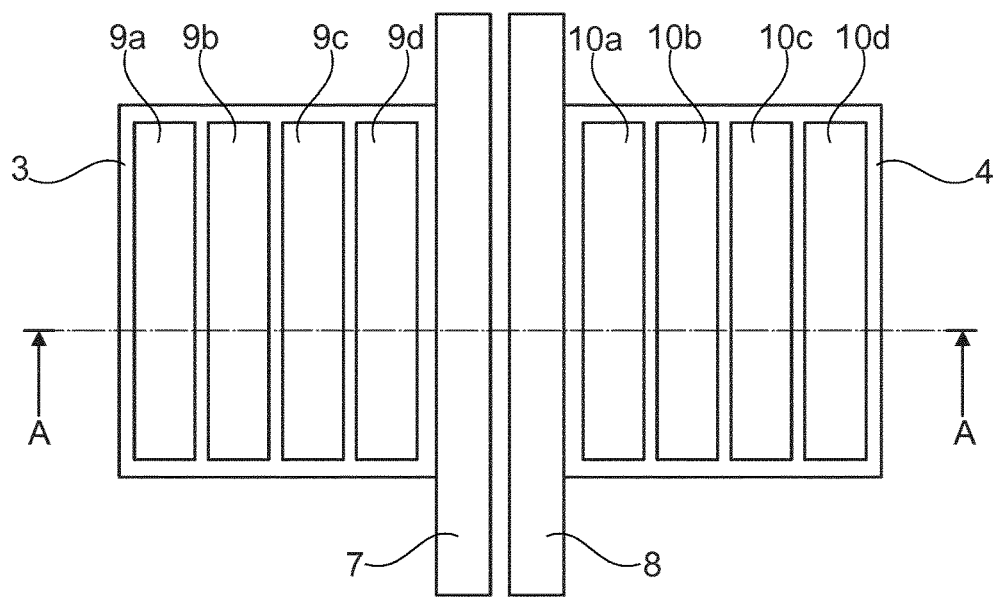

FIG. 1B shows a plan view of the arrangement shown in FIG. 1A.

Figure 2:
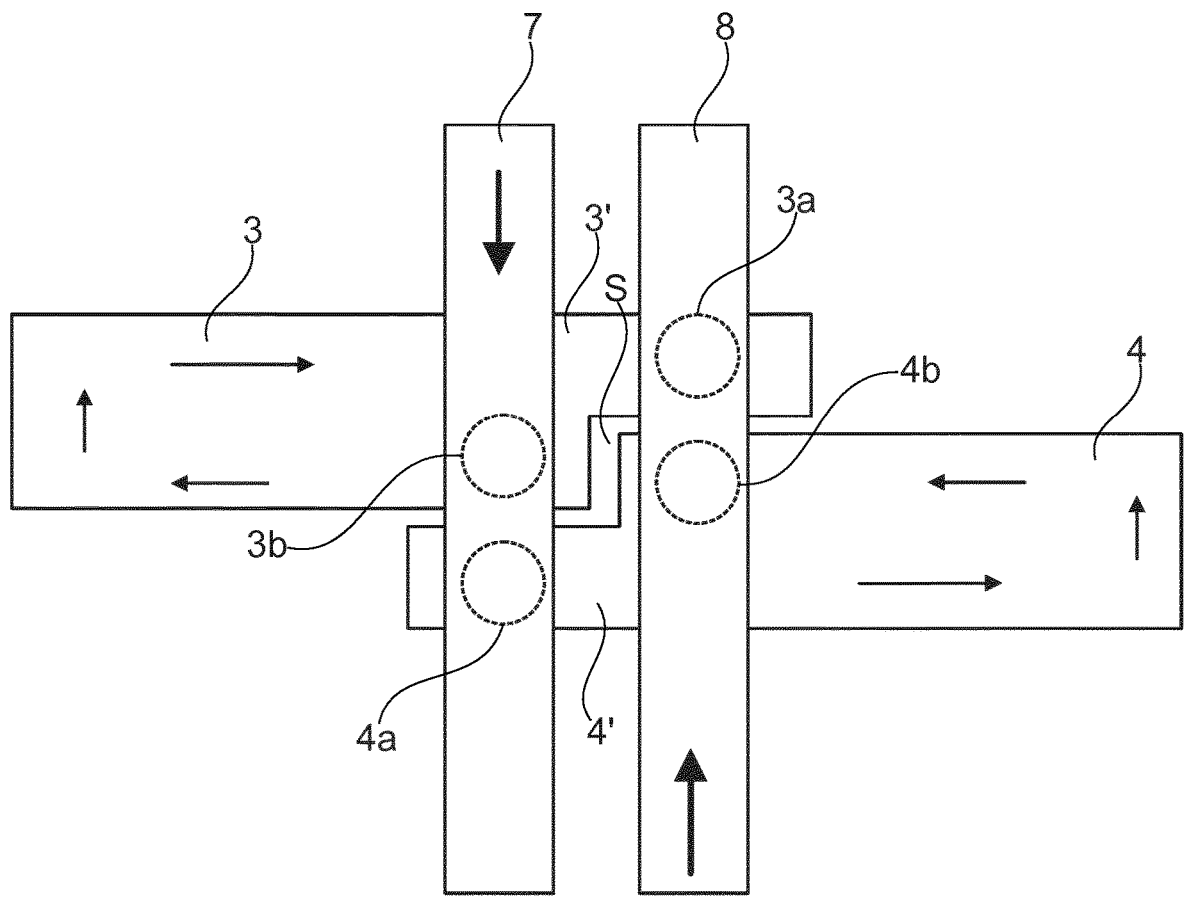
FIG. 2 shows the connection according to an embodiment of the invention of the cooling modules of a pair of accumulator modules to a central inflow channel and a central outflow channel.

FIG. 2 shows a plan view of cooling modules 3, 4 of a pair of accumulator modules (not further illustrated here), which cooling modules are designed and arranged according to the invention. In a manner analogous to the situation in FIGS. 1A, 1B, multiple accumulator cells are arranged one behind the other on each of the cooling modules 3, 4.

As can be seen from FIG. 2, the cooling modules 3, 4 are of identical design but are arranged in a point-symmetrical manner with respect to a point of symmetry S.

The cooling module 3 has a first fluid connector 3a and a second fluid connector 3b. The cooling module 4 likewise has a first fluid connector 4a and a second fluid connector 4b. The first fluid connectors 3a, 4a are arranged in a point-symmetrical manner with respect to the point of symmetry S. Correspondingly, the second fluid connectors 3b, 4b are likewise arranged in a point-symmetrical manner with respect to the point of symmetry S.

The fluid connectors 3a, 3b of the cooling module 3 are arranged in a connection region 3' of the cooling module 3. Correspondingly, the fluid connectors 4a, 4b of the cooling module 4 are arranged in a connection region 4 of the cooling module 4.

As already mentioned, FIG. 2 shows a plan view of the cooling modules 3, 4. If the cooling modules 3, 4 are viewed in the direction of the central inflow channel 7 or the central outflow channel 8 in the plane of the drawing, then it can be seen that the central connection region 3' is arranged behind the central connection region 4', or vice versa. In other words, this means that the cooling modules 3, 4 "overlap" in the region of their connection regions 3', 4' if the cooling modules are viewed in a longitudinal direction of the inflow channel 7 or the outflow channel 8.

As can be seen from FIG. 2, the central inflow channel 7 is connected to the first fluid connector 4a of the cooling module 4 and to the second fluid connector 3b of the cooling module 3. The central outflow channel 8 is correspondingly connected to the first fluid connector 3a of the cooling module 3 and to the second fluid connector 4b of the cooling module 4. As viewed in the direction of the central inflow channel 7 or the central outflow channel 8, the fluid connectors 4a, 3b are thus arranged one behind the other. Likewise, as viewed in a longitudinal direction of the inflow channel 7 or the outflow channel 8, the fluid connectors 3a, 4b are arranged one behind the other. Owing to the arrangement shown in FIG. 2, coolant or refrigerant flows through the cooling modules 3, 4 in opposite directions.

A major advantage of the arrangement shown in FIG. 2 can be seen in the fact that a crossing arrangement of fluid connections, as is the case with the conventional arrangement shown in FIG. 1a, can be avoided, which is clearly advantageous both from assembly aspects and from installation space aspects.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A high-voltage accumulator, comprising:
   at least one pair of accumulator modules comprising a first accumulator module and a second accumulator module, wherein the first and second accumulator modules each have:
   at least two electrical accumulator cells, and
   one cooling module, through which a coolant or refrigerant flows, wherein the cooling module of each accumulator module is thermally coupled to the accumulator cells of the associated accumulator module and is provided for removing heat emitted by the accumulator cells, and has a first and a second fluid connector for coolant or refrigerant,
   an inflow channel for cold coolant or refrigerant, which is fluidically connected to in each case one fluid connector of each of the two cooling modules of the pair of accumulator modules; and
   an outflow channel for heated coolant or refrigerant, which is fluidically connected to the respective other fluid connector of the two cooling modules of the pair of accumulator modules,
   wherein
   the cooling modules of the two accumulator modules have an identical geometry in their entirety or at least in a region of the fluid connectors wherein
   the inflow channel is fluidically connected to the first fluid connector of the cooling module of the first accumulator module and to the second fluid connector of the cooling module of the second accumulator module,
   the outflow channel is fluidically connected to the second fluid connector of the cooling module of the first accumulator module and to the first fluid connector of the cooling module of the second accumulator module,
   coolant or refrigerant enters the first cooling module along a first direction that is parallel to a longitudinal direction along which the accumulator cells associated with the first cooling module are arranged one behind the other, and the coolant or refrigerant enters the second cooling module along a second direction that is parallel to the longitudinal direction and opposite to the first direction, and
   the coolant or refrigerant flows through the first coolant module independently of the second coolant module.

2. The high-voltage accumulator according to claim 1, wherein
   the cooling module of the first accumulator module is arranged in a point-symmetrical manner with respect to the cooling module of the second accumulator module, and vice versa.

3. The high-voltage accumulator according to claim 2, wherein
   the first fluid connector of the cooling module of the first accumulator module is arranged in a point-symmetrical manner with respect to the first fluid connector of the cooling module of the second accumulator module, and vice versa.

4. The high-voltage accumulator according to claim 3, wherein
   the second fluid connector of the cooling module of the first accumulator module is arranged in a point-symmetrical manner with respect to the second fluid connector of the cooling module of the second accumulator module, and vice versa.

5. The high-voltage accumulator according to claim 1, wherein
   the cooling modules each have a connection region in which the first and second fluid connectors are provided, wherein, as viewed in a longitudinal direction of the inflow channel and/or the outflow channel, the connection region of the cooling module of the first accumulator module is arranged in front of the connection region of the cooling module of the second accumulator module, or vice versa.

6. The high-voltage accumulator according to claim 1, wherein
   as viewed in a longitudinal direction of the inflow channel and/or the outflow channel, the first fluid connector of the cooling module of the first accumulator module is arranged in front of the second fluid connector of the cooling module of the second accumulator module, or vice versa.

7. The high-voltage accumulator according to claim 6, wherein
   as viewed in the longitudinal direction of the inflow channel and/or the outflow channel, the second fluid connector of the cooling module of the first accumulator module is arranged in front of the first fluid connector of the cooling module of the second accumulator module, or vice versa.

8. The high-voltage accumulator according to claim 1, wherein
the inflow channel and the outflow channel are arranged in a parallel manner at least in the region between the first and second accumulator modules.

9. The high-voltage accumulator according to claim 1, wherein
the high-voltage accumulator has multiple pairs of first and second accumulator modules, which pairs are arranged one behind the other in the first direction.

10. The high-voltage accumulator according to claim 9, wherein
the inflow channel and the outflow channel extend in a first direction in the region between the first and second accumulator modules of the pairs of accumulator modules.

11. The high-voltage accumulator according to claim 1, wherein
the cooling modules have a plate-shape and, in their interior, have flow channels for coolant or refrigerant, wherein each accumulator module has multiple accumulator cells, which are arranged one behind the other on the cooling module in a along the longitudinal direction of the respective cooling module.

12. A vehicle, comprising a high-voltage accumulator according to claim 1.

* * * * *